US012578832B2

(12) United States Patent
Rodolico et al.

(10) Patent No.: US 12,578,832 B2
(45) Date of Patent: Mar. 17, 2026

(54) DISTANCE-BASED USER INTERFACES

(71) Applicant: COMCAST CABLE COMMUNICATIONS, LLC, Philadelphia, PA (US)

(72) Inventors: Joseph Rodolico, Horsham, PA (US); Michael Sallas, Radnor, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/037,892

(22) Filed: Jul. 17, 2018

(65) Prior Publication Data
US 2020/0026394 A1 Jan. 23, 2020

(51) Int. Cl.
| | |
|---|---|
| *G06F 3/0481* | (2022.01) |
| *G01S 13/08* | (2006.01) |
| *G06F 3/0484* | (2022.01) |
| *G06F 3/16* | (2006.01) |
| *G06T 3/40* | (2006.01) |

(52) U.S. Cl.
CPC ............ *G06F 3/0481* (2013.01); *G01S 13/08* (2013.01); *G06F 3/0484* (2013.01); *G06F 3/167* (2013.01); *G06T 3/40* (2013.01)

(58) Field of Classification Search
CPC ...................................................... G06F 9/451
See application file for complete search history.

(56) References Cited

U.S. PATENT DOCUMENTS

| | | | | |
|---|---|---|---|---|
| 6,542,436 B1* | 4/2003 | Myllyla | ................. | G01S 7/527 |
| | | | | 340/686.6 |
| 8,203,577 B2* | 6/2012 | Hoover | ................. | G06F 3/0481 |
| | | | | 345/661 |
| 9,781,484 B2* | 10/2017 | Ferren | ................. | G06K 9/3266 |
| 10,147,439 B1* | 12/2018 | Kristjansson | ............ | G01S 5/18 |
| 2002/0159434 A1* | 10/2002 | Gosior | ................. | H04L 1/1685 |
| | | | | 370/350 |
| 2006/0109112 A1* | 5/2006 | Haines | ................. | G08B 21/24 |
| | | | | 340/539.32 |
| 2007/0173212 A1* | 7/2007 | Mergler | ................. | G08C 19/28 |
| | | | | 455/92 |
| 2008/0186176 A1* | 8/2008 | Hardacker | ............ | G08B 21/24 |
| | | | | 340/572.1 |
| 2009/0079765 A1 | 3/2009 | Hoover | | |
| 2009/0164896 A1 | 6/2009 | Thorn | | |
| 2010/0014004 A1* | 1/2010 | Dai | ........................ | H03G 7/007 |
| | | | | 348/734 |

(Continued)

OTHER PUBLICATIONS

Sun et al., "Spartacus: spatially-aware interaction for mobile devices through energy-efficient audio sensing" MobiSys '13, Jun. 2013, p. 263-76. (Year: 2013).*

(Continued)

*Primary Examiner* — Haoshian Shih
(74) *Attorney, Agent, or Firm* — Ballard Spahr LLP

(57) ABSTRACT

Systems and methods are described for distance-based user interfaces. A distance between a user and a display can be determined. The distance between the user and the display can be determined based on a signal strength of a signal from a remote control. The distance between the user and the display can be determined based on audio signals received by a control device. A user interface can be modified based on the determined distance.

24 Claims, 8 Drawing Sheets

(56)  References Cited

U.S. PATENT DOCUMENTS

| 2011/0279354 | A1* | 11/2011 | Tang | G06F 9/451 |
| | | | | 345/3.2 |
| 2012/0287163 | A1 | 11/2012 | Djavaherian | |
| 2013/0113993 | A1* | 5/2013 | Dagit, III | G06F 3/017 |
| | | | | 348/552 |
| 2014/0235265 | A1* | 8/2014 | Slupik | H04M 1/72533 |
| | | | | 455/456.1 |
| 2016/0246364 | A1* | 8/2016 | Miller | G06F 3/012 |
| 2016/0330396 | A1* | 11/2016 | Garcia Navarro | H04N 5/445 |
| 2018/0067631 | A1* | 3/2018 | Thiercelin | G06F 3/04845 |

OTHER PUBLICATIONS

Chin-Feng et al., "A RF4CE-based remote controller with interactive graphical user interface applied to home automation system" ACM Transactions on Embedded Computing Systems (TECS)—(ES-IMS): vol. 12 Issue 2, Feb. 2013, 19 pages. (Year: 2013).*

* cited by examiner

Program Guide

121a

130a

Program Guide

121b

130b

600

610
RECEIVE AUDIO SIGNAL FROM REMOTE CONTROL

620
DETERMINE DISTANCE BETWEEN REMOTE CONTROL AND SOURCE OF AUDIO SIGNAL

630
GENERATE USER INTERFACE BASED ON DISTANCE

640
CAUSE OUTPUT OF THE USER INTERFACE

700

710

DETERMINE DISTANCE BETWEEN USER AND CONTROL DEVICE BASED ON AN AUDIO USER INPUT TO THE CONTROL DEVICE

720

DETERMINE DISTANCE BETWEEN USER AND DISPLAY

730

GENERATE USER INTERFACE BASED ON DISTANCE

740

CAUSE OUTPUT OF THE USER INTERFACE

DISTANCE-BASED USER INTERFACES

BACKGROUND

User interfaces may display text to a user. A channel guide may list the names and/or descriptions of content available to a user. As a user moves farther from a display, the text of these user interfaces may become difficult to read. If the size of the text is adjustable, it requires a user to manually configure the size of the text using menu-based configuration options. This places a burden on the user, and may require the user to repeatedly configure the text size as their distance relative to the display changes. These and other shortcomings are addressed herein.

SUMMARY

It is to be understood that both the following general description and the following detailed description are exemplary and explanatory only and are not restrictive. Provided are methods and systems for distance-based user interface modification. A distance of a remote control to an output device may be measured and used as a proxy for a distance of a user to a display. Assuming that a user is proximate to a remote control (e.g., a radio frequency (RF) remote control) and a display is proximate to output device (e.g., a set top box), the distance from the user to the display may be measured as a signal strength between the remote control and the output device. The distance of the user to the display may be measured based on a volume or signal-to-noise ratio of an audio signal (e.g., audio of content output by the output device) received by a microphone on the remote control. The distance of the user to the display may be measured based on an audio input by the user to a control device (e.g., a stationary control device) and the distance of the stationary control device to the display. A user interface may then be modified using the measured distance of the user to the display. The user interface may be modified in response to the measured distance satisfying a threshold. A text font size may be modified. A user interface layout may be modified.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show embodiments and together with the description, serve to explain the principles of the methods and systems.

DETAILED DESCRIPTION

Figure 1:
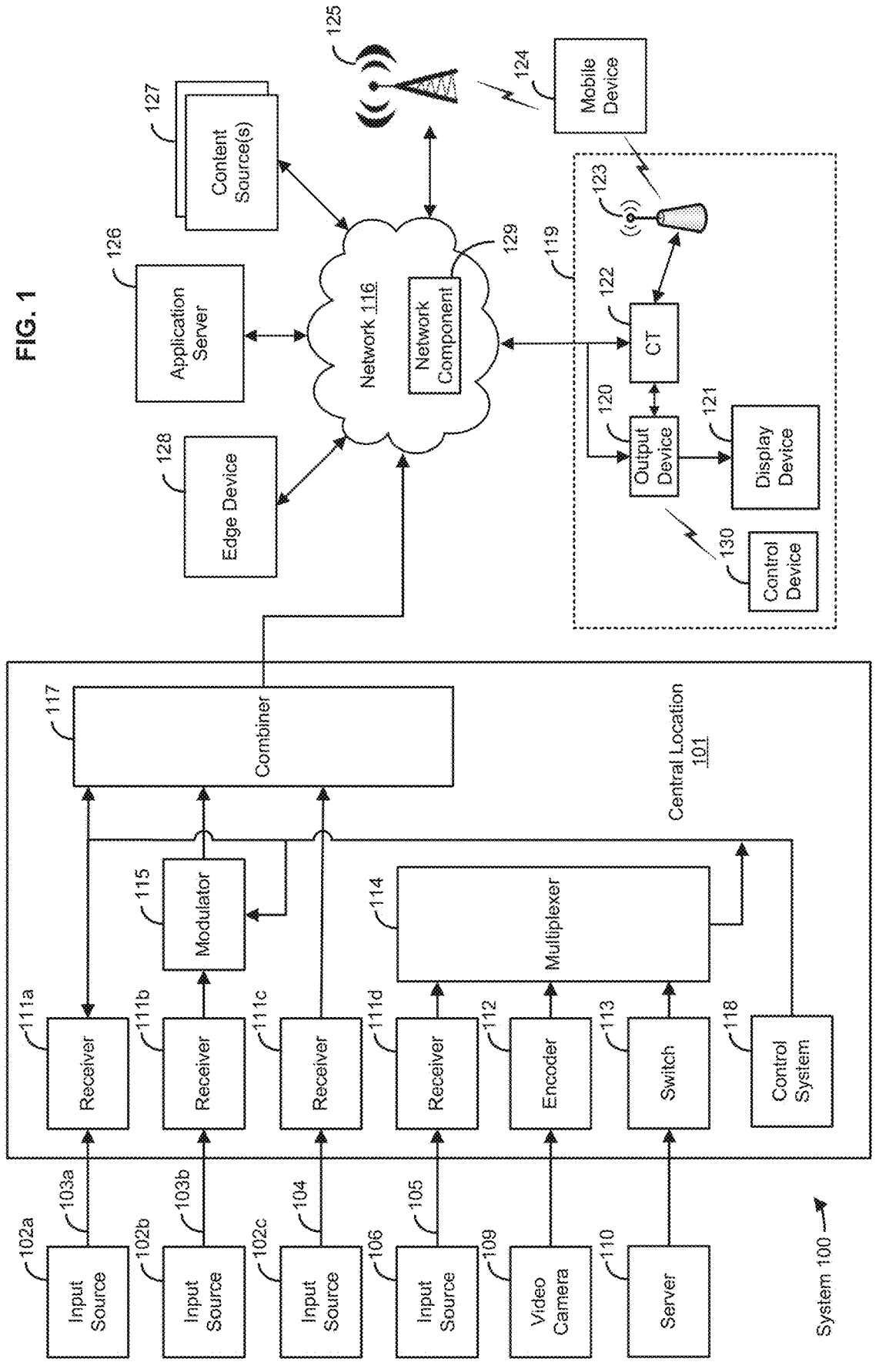
FIG. 1 is a diagram of a content delivery network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. When values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal embodiment. "Such as" is not used in a restrictive sense, but for explanatory purposes.

Described herein are components that may be used to perform the described methods and systems. These and other components are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all examples of this application including, but not limited to, steps in described methods. Thus, if there are a variety of additional steps that may be performed it is understood that each of these additional steps may be performed with any specific embodiment or combination of embodiments of the described methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware examples. Furthermore, the methods and systems may take the form of a computer program product on a computer-readable storage medium having computer-readable program instructions (e.g., computer software) embodied in the storage medium. The present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to content items (which may also be referred to as "content," "content data," "content information," "content asset," "multimedia asset data file," or simply "data" or "information"). Content items may comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, Adobe® Flash® Video (FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0,1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

This detailed description may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

Described herein is a distance-based user interface modification. Output devices (e.g., set-top boxes) may cause a user interface to be displayed. A content guide may display text identifying content available to a user, descriptions of content available to a user, menus for device configuration options, or other text. As a user moves further from a display, the displayed text can become more difficult to read. If the size of the text is adjustable, it requires a user to manually configure the size of the text using menu-based configuration options. This places a burden on the user, and can require the user to repeatedly configure the text size as their distance relative to the display changes.

A user interface may be automatically modified based on a distance of a user to a display. Assuming that the user is proximate to a remote control (e.g., a radio frequency (RF) remote control) and the display is proximate to output device (e.g., a set top box), the distance from the user to the display may be measured (e.g., by the output device) based on a signal strength between the remote control and the output device. The distance of the user to the display can be measured based on a volume or signal-to-noise ratio of an audio signal (e.g., audio of content output by the output device) received by a microphone on the remote control. An output device can output audio at a known volume. The distance can then be measured based on a difference between the known volume of the audio signal and the volume of the audio signal as received by the remote control.

The distance of the user to the display may be measured based on an audio input by the user to a control device (e.g., a stationary control device) and the distance of the stationary control device to the display. The distance of the user to the control device may be measured based on a volume of the audio input as received by the control device. The distance of the stationary control device to the display can comprise a predefined value, e.g., a user input. The distance of the stationary device to the display can also be measured based on a known volume of an audio signal (e.g., audio of content output by the output device) and the volume of the audio signal as received by a microphone on the control device.

A user interface may then be modified using the measured distance of the user to the display. The user interface may be modified in response to the measured distance satisfying a threshold. The user interface may be modified based on which of a plurality of distance ranges (e.g., "buckets") into which the measured distance falls. Modifying the user interface can include modifying one or more text sizes or fonts. Modifying the user interface may include resizing one or more images, or causing output of one or more other images. Modifying the user interface can include modifying templates or layouts of the user interface.

FIG. 1 shows a system in which the methods and systems may operate. Those skilled in the art will appreciate that the methods may be used in systems that employ both digital and analog equipment. One skilled in the art will appreciate that provided herein is a functional description and that the respective functions can be performed by software, hardware, or a combination of software and hardware.

A system 100 may comprise a central location 101 (e.g., a headend), which may receive content (e.g., data, input programming, and the like) from multiple sources. The central location 101 can combine the content from the various sources and can distribute the content to user (e.g., subscriber) locations (e.g., location 119) via a distribution system 116.

The central location 101 may receive content from a variety of sources 102a, 102b, 102c. The content may be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 may comprise one or a plurality of receivers 111a, 111b, 111c, 111d that are each associated with an input source. MPEG encoders such as an encoder 112, are included for encoding local content or a video camera 109 feed. A switch 113 may provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 may comprise one or a plurality of modulators 115 for interfacing to a network 116. The modulators 115 may convert the received content into a modulated output signal suitable for transmission over a network 116. The output signals from the modulators 115 may be combined, using equipment such as a combiner 117, for input into the network 116. The network 116 may comprise a content delivery network, a content access network, and/or the like. The network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 may permit a system operator to control and monitor the functions and performance of the system 100. The control system 118 may interface, monitor, and/or control a variety of functions, including, but not limited to, the channel lineup for the television system, billing for each user, conditional access for content distributed to users, and the like. The control system 118 may provide input to the modulators for setting operating parameters, such as system specific MPEG table packet organization or conditional access information. The control system 118 can be located at the central location 101 or at a remote location.

The network 116 may distribute signals from the central location 101 to user locations, such as a user location 119. The network 116 may comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

A multitude of users may be connected to the network 116 at one or more of the user locations. At the user location 119, output device 120 may demodulate and/or decode, if needed, the signals for display on a display device 121, such as on a television set (TV) or a computer monitor. The output device 120 can comprise a demodulator, decoder, frequency tuner, and/or the like. The output device 120 can be directly connected to the network (e.g., for communications via in-band and/or out-of-band signals of a content delivery network) and/or connected to the network 116 via a communication terminal 122 (e.g., for communications via a packet switched network). The output device 120 may comprise a set-top box, a digital streaming device, a gaming device, a media storage device, a digital recording device, a combination thereof, and/or the like. The output device 120 may comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

A control device 130 may be used to control one or more functions of the output device 120 and/or display device 121. The control device 130 may comprise a remote control. The control device 130 may transmit infrared signals, radio frequency (RF) signals, or other signals to the output device 120 and/or display device 121. The control device 130 can also comprise a stationary device configured to control the output device 120 and/or display device 121 using user voice commands. The control device 130 (e.g., remote control and/or stationary device) can also comprise a microphone. Thus, the control device 130 can accept an audio signal (e.g., a user voice command) to control the output device 120 and/or display device 121.

The output device 120 and/or display device 121 may determine a distance of a user to the display device 121. The distance of the user to the display device 121 may be determined as a distance of a remote control (the control device 130), assuming the user is proximate to the remote control, to the output device 120 (assuming the output device 120 is proximate to the display device) and/or display device 121. The output device 120 and/or display device 121 may receive a signal from the remote control. The signal can comprise a radio frequency (RF) signal, infrared signal, microwave signal, or other signal as may be appreciated. The remote control can be configured to transmit the signal at a predefined interval. Thus, the signal may be received by the output device 120 and/or display device 121 according to the predefined interval. The output device 120 and/or display device 121 can also receive the signal as a command transmitted to the output device 120 and/or display device 121 by the remote control.

The output device 120 and/or display device 121 may then determine the distance to the remote control based on a signal strength of the received signal from the remote control. The signal strength of the received signal can be compared to one or more predefined signal strengths. The remote control can be calibrated relative to the output device 120 and/or display device 121 by transmitting one or more signals at one or more predefined distances. Thus, the signal strength of the transmitted one or more signals may correspond to the one or more predefined signal strengths. The distance of the remote control to the output device 120 and/or display device 121 can then be determined based on a nearest one of the one or more predefined signal strengths. The distance of the remote control to the output device 120 and/or display device 121 can also be determined based on a difference between a transmission power of the signal and a strength of the signal as received by the output device 120 and/or display device 121.

The distance of the user relative to the output device 120 and/or display device 121 may also be determined based on a strength of an audio signal received by a microphone of the remote control, again assuming that the remote control is proximate to the user. Content output by the output device 120 can generate an audio signal output by the display 120 or one or more external speakers (e.g., a stereo or home theater). The distance of the user to the output device 120 and/or display device 121 may then be determined based on a volume of the audio signal as received by the remote control and a volume of the audio signal as output by a source of the audio signal (e.g., the display 120 or the one or more external speakers).

The distance of the user relative to the output device 120 and/or display device 121 may also be determined based on a distance of the user relative to a stationary control device (the control device 130) having one or more microphones. A volume of an audio input by a user to the stationary control device may be used to determine a distance of the user to the stationary control device. Based on this determined distance of the user to the stationary control device and a distance of the stationary control device to the output device 120 and/or display device 121, the distance of the user relative to the output device 120 and/or display device 121 can be determined. The distance of the stationary control device to the output device 120 and/or display device 121 can comprise a predefined distance, e.g., a user input or configuration. The distance of the stationary control device to the output device 120 and/or display device 121 can also be calculated by the stationary control device based on one or more audio signals received by the stationary control device from the output device 120, display device 121, or one or more stationary speakers. The distance of the user to the output device 120 and/or display device 121 may be determined based on a sum of the distance of the user to the stationary control device and the distance of the stationary control device to the output device 120 and/or display device 121.

The distance of the user to the output device 120 and/or display device 121 may be determined trigonometrically based on a sum of the distance of the user to the stationary control device and the distance of the stationary control device to the output device 120 and/or display device 121. The stationary control device can comprise a plurality of microphones. The stationary control device may then determine the angle of the stationary control device relative to the output device 120 and/or display device 121, and relative to the user based on audio signals received by the plurality of microphones. The determined angles and distances can then be used to trigonometrically determine the distance of the user to the output device 120 and/or display device 121.

Figures 2A, 2B:
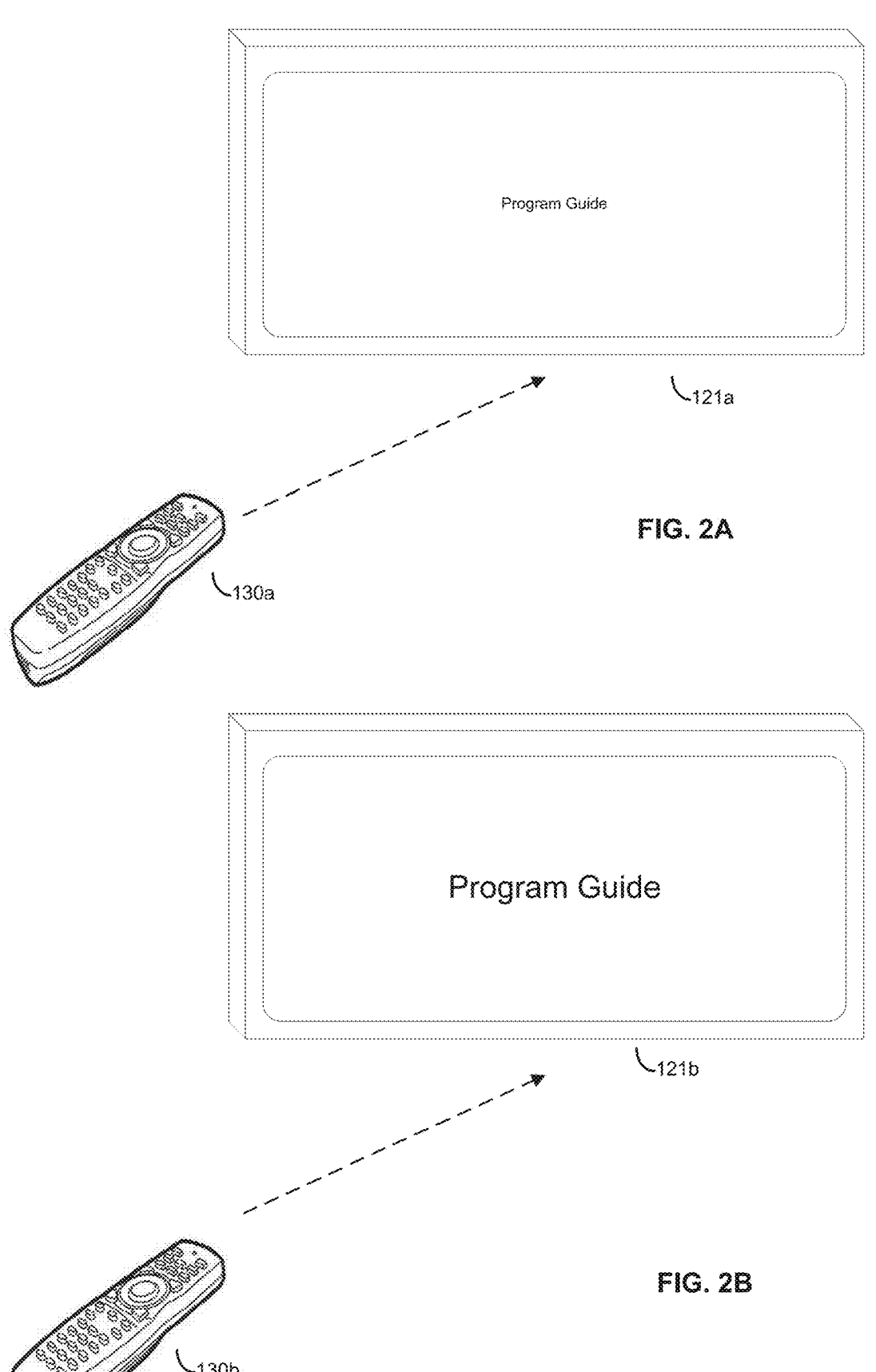
FIG. 2A is a diagram of a system.
FIG. 2B is a diagram of a system.

The output device 120 and/or display device 121 may then modify a user interface based on the determined distance of the user to the output device 120 and/or display device 121. The output device 120 and/or display device 121 can determine to modify the user interface after determining the distance of the user to the output device 120 and/or display device 121 satisfies a threshold. Modifying the user interface may include modifying a font of the user interface. The font size can be increased or decreased. The font style can be modified from a first style to a second style. Modifying the user interface may also include resizing one or more images. Modifying the user interface may also include determining one or more images for display. Modifying the user interface can also include determining a template or layout to be used for generating the user interface. As seen in FIG. 2A, a control device 130a is a distance X (e.g., 10 feet) from a display device 121a. The text is displayed on the display device 121a at a first font size. In FIG. 2B, the control device 130a is a distance X+n (e.g., 15 feet) from the display device 121a, and the text is displayed at a greater font size.

Modifying the user interface may include determining one or more distance ranges into which the distance of the user to the output device 120 and/or display device 121 falls. A first user interface may be presented in response to the distance of the user to the output device 120 and/or display device 121 being less than or equal to fifteen feet. Thus, the predefined threshold to be satisfied is fifteen feet. The first user interface can be modified to a second user interface (e.g., comprising a greater font size relative to the first user interface) in response to the distance of the user to the output device 120 and/or display device 121 being between fifteen feet and twenty feet. The first and/or second user interface can be modified to a third user interface (e.g., comprising a greater font size relative to the first/second user interface) in response to the distance of the user to the output device 120 and/or display device 121 being greater than twenty feet. The user interface may also be dynamically modified based on the determined distance of the user to the first user interface can be modified to a second user interface (e.g., comprising a greater font size relative to the first user interface) in response to the distance of the user to the output device 120 and/or display device 121 being between fifteen feet and twenty feet.

Where the user interface is modified after a distance satisfying a threshold, the threshold may be modified after a user input. After modifying the user interface, the output device 120 and/or the display device 121 can solicit a user input to indicate whether the modification to the user interface was beneficial. A user input indicates that the modification was not beneficial, the threshold may be modified (e.g., increased or decreased) and/or the modifications to the user interface can be reverted.

The output device 120 and/or display device 121 may also modify, based on the determined distance of the user to the output device 120 and/or display device 121, an output of the content. A volume of an audio portion of the content can be increased and/or decreased based on the determined distance of the user. A font size of closed captioning or subtitles can be increased or decreased based on the determined distance of the user.

The communication terminal 122 may be located at the user location 119. The communication terminal 122 may be configured to communicate with the network 116. The communications terminal 122 may comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For a cable network, the communication terminal 122 can be configured to provide network access via a variety of communication protocols and standards, such as Data Over Cable Service Interface Specification.

The user location 119 may comprise a first access point 123, such as a wireless access point. The first access point 123 may be configured to provide one or more wireless networks in at least a portion of the user location 119. The first access point 123 can be configured to provide access to the network 116 to devices configured with a compatible wireless radio, such as a mobile device 124, the output device 120, the display device 121, or other computing devices (e.g., laptops, sensor devices, security devices). The first access point 123 can provide a user managed network (e.g., local area network), a service provider managed network (e.g., public network for users of the service provider), and/or the like. It should be noted that in some configurations, some or all of the first access point 123, the communication terminal 122, the output device 120, and the display device 121 may be implemented as a single device.

The user location 119 may not be fixed. A user may receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). The mobile device 124 may communicate with a second access point 125. The second access point 125 can be a cell tower, a wireless hotspot, another mobile device, and/or other remote access point. The second access point 125 may be within range of the user location 119 or remote from the user location 119. The second access point 125 can be located along a travel route, within a business or residence, or other useful locations (e.g., travel stop, city center, park).

The system 100 may comprise an application device 126. The application device 126 may be a computing device, such as a server. The application device 126 can provide services related to applications. The application device 126 may comprise an application store. The application store can be configured to allow users to purchase, download, install, upgrade, and/or otherwise manage applications. The application device 126 may be configured to allow users to download applications to a device, such as the mobile device 124, communications terminal 122, the output device 120, the display device 121, and/or the like. The application device 126 can run one or more application services to provide data, handle requests, and/or otherwise facilitate operation of applications for the user.

The system 100 may comprise one or more content source(s) 127. The content source(s) 127 may be configured to provide content video, audio, games, applications, data) to the user. The content source(s) 127 may be configured to provide streaming media, such as on-demand content (e.g., video on-demand), content recordings, and/or the like. The content source(s) 127 can be managed by third party content providers, service providers, online content providers, over-the-top content providers, and/or the like. The content may be provided via a subscription, by individual item purchase or rental, and/or the like. The content source(s) 127 can be configured to provide the content via a packet switched network path, such as via an internet protocol (IP) based connection. The content may be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

The system 100 may comprise an edge device 128. The edge device 128 may be configured to provide content, services, and/or the like to the user location 119. The edge device 128 can be one of a plurality of edge devices distributed across the network 116. The edge device 128 may be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

The network 116 may comprise a network component 129. The network component 129 may comprise any device, module, and/or the like communicatively coupled to the network 116. The network component 129 can comprise a router, a switch, a splitter, a packager, a gateway, a encoder, a storage device, a multiplexer, a network access location (e.g., tap), physical link, and/or the like.

Figure 3:
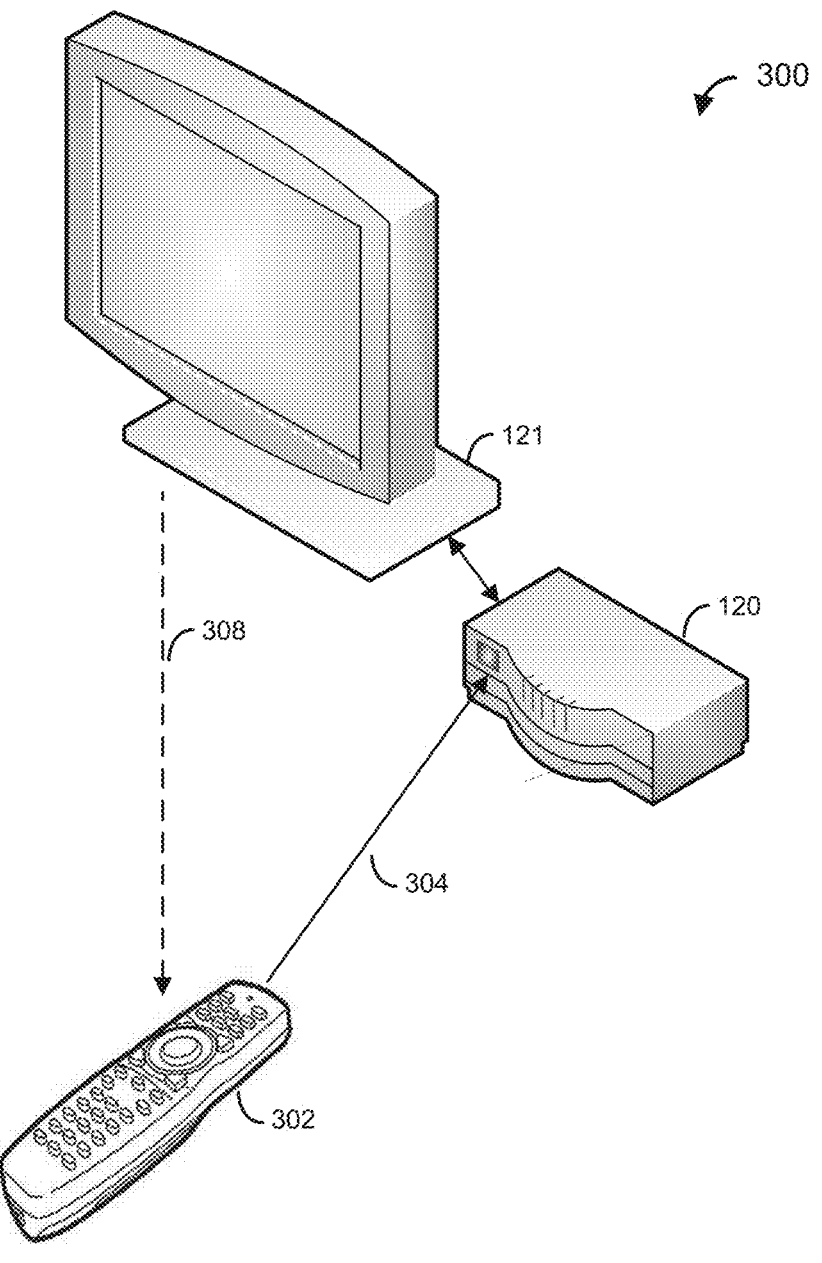
FIG. 3 is a diagram of a system.

FIG. 3 shows a system 300. The system 300 includes the display device 121 configured to receive video and/or audio output from the output device 120. The output device 120 may be controlled by a remote control 302 (e.g., the control device 130 of FIG. 1) using one or more signals 304. The signal 304 can comprise an infrared signal, radio frequency (RF) signal, microwave signal, or other signal as can be appreciated. The remote control 302 may include a microphone. The remote control 302 may receive, via the microphone, an audio signal from the display 121 (e.g., an audio portion of content output to the display 121 by the output device 120).

The output device 120 may determine a distance of a user to the display device 121. The distance of the user to the display device 121 may be determined as a distance of the remote control 202 (assuming the user is proximate to the remote control 202) to the output device 120 (assuming the output device 120 is proximate to the display device 121) based on a signal strength of the signal 304. The signal strength of the received signal 304 can be compared to one or more predefined signal strengths. The remote control 302 may be calibrated relative to the output device 120 by transmitting one or more signals at one or more predefined distances. Thus, the signal strength of the transmitted one or more signals can correspond to the one or more predefined signal strengths. The distance of the remote control to the output device 120 may then be determined based on a nearest one of the one or more predefined signal strengths. The distance of the remote control 302 to the output device 120 can also be determined based on a difference between a transmission power of the signal and a strength of the signal as received by the output device 120.

The distance of the user relative to the display device 121 can be determined based on the audio signal 308 received by a microphone of the remote control 302, again assuming that the remote control 302 is proximate to the user. Content output by the output device 120 may cause an audio signal to be output by the display 120 or one or more external speakers (e.g., a stereo or home theater). The distance of the user to the display device 121 can then be determined based on a volume of the audio signal 208 as received by the remote control and a volume of the audio signal 208 as output by a source of the audio signal (e.g., the display 120 or the one or more external speakers).

The output device 120 may then modify a user interface based on the determined distance of the user to the display device 121. The output device 120 may determine to modify the user interface after determining the distance of the user to the output device 120 satisfies a threshold. Modifying the user interface can include modifying a font of the user interface. The font size may be increased or decreased. The font style can be modified from a first style to a second style. Modifying the user interface can also include resizing one or more images. Modifying the user interface may also include determining one or more images for display. Modifying the user interface can also include determining a template or layout to be used for generating the user interface.

Modifying the user interface may include determining one or more distance ranges into which the distance of the user to the display device 121 falls. A first user interface may be presented in response to the distance of the user to the display device 121 being less than or equal to fifteen feet. Thus, the predefined threshold to be satisfied is fifteen feet. The first user interface can be modified to a second user interface (e.g., comprising a greater font size relative to the first user interface) in response to the distance of the user to the display device 121 being between fifteen feet and twenty feet. The first and/or second user interface may be modified to a third user interface (e.g., comprising a greater font size relative to the first/second user interface) in response to the distance of the user to the display device 121 being greater than twenty feet. The user interface can also be dynamically modified based on the determined distance of the user to the first user interface may be modified to a second user interface (e.g., comprising a greater font size relative to the first user interface) in response to the distance of the user to the display device 121 being between fifteen feet and twenty feet.

Figure 4:
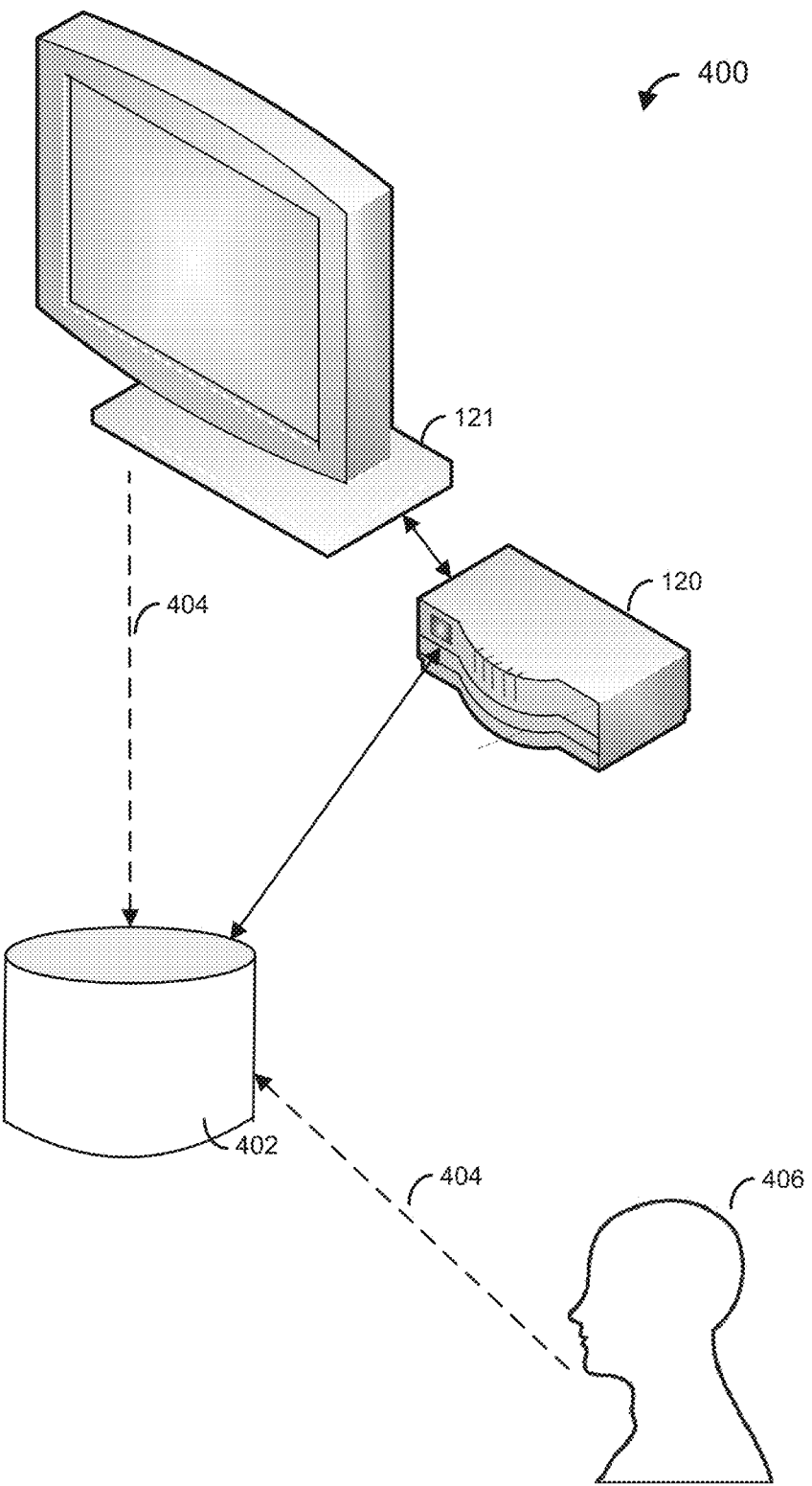
FIG. 4 is a diagram of a system.

FIG. 4 shows a system 400. The example system 400 includes the display device 121 configured to output received video and audio data from the output device 120. The output device 120 may be controlled by a stationary control device 402 (e.g., the control device 130 of FIG. 1) based on one or more voice commands 404 from a user 406 to one or more microphones of the stationary control device 402.

The output device 120 may determine a distance of the user 406 to the display device 121. The distance of the user 406 to the display device 121 can be determined based on a distance of the user 406 to the stationary control device 402. A volume of a voice command 404 to the stationary control device 402 may be used to determine a distance of the user 406 to the stationary control device 402. Based on this determined distance of the user 406 to the stationary control device 402 and a distance of the stationary control device 402 to the display device 121, the distance of the user 406 relative to the display device 121 can be determined. The distance of the stationary control device 402 to the display device 121 may comprise a predefined distance, e.g., a user input or configuration. The distance of the stationary control device 402 to the display device 121 can also be calculated by the stationary control device 402 based on one or more audio signals received by the stationary control device 402 from the display device 121 or one or more stationary speakers. The distance of the user 406 to the display device 121 may be determined based on a sum of the distance of the user 406 to the stationary control device 402 and the distance of the stationary control device 402 to the display device 121.

The distance of the user 406 to the display device 121 may be determined trigonometrically based on a sum of the distance of the user 406 to the stationary control device 402 and the distance of the stationary control device 402 to the display device 121. The stationary control device 402 can comprise a plurality of microphones. The stationary control device 402 may then determine the angles of the stationary control device 402 relative to the display device 121 and relative to the user 406 based on audio signals received by the plurality of microphones. The determined angles and distances can then be used to trigonometrically determine the distance of the user to the display device 121.

The output device 120 may then modify a user interface based on the determined distance of the user 406 to the display device 121. The output device 120 can determine to modify the user interface after determining the distance of the user to the output device 120 satisfies a threshold. Modifying the user interface may include modifying a font of the user interface. The font size can be increased or decreased. The font style may be modified from a first style to a second style. Modifying the user interface can also include resizing one or more images. Modifying the user interface may also include determining one or more images for display. Modifying the user interface can also include determining a template or layout to be used for generating the user interface.

Modifying the user interface may include determining one or more distance ranges into which the distance of the user to the display device 121 falls. A first user interface may be presented in response to the distance of the user to the display device 121 being less than or equal to fifteen feet. Thus, the predefined threshold to be satisfied. is fifteen feet. The first user interface can be modified to a second user interface (e.g., comprising a greater font size relative to the first user interface) in response to the distance of the user to the display device 121 being between fifteen feet and twenty feet. The first and/or second user interface can be modified to a third user interface (e.g., comprising a greater font size relative to the first/second user interface) in response to the distance of the user to the display device 121 being greater than twenty feet. The user interface can also be dynamically modified based on the determined distance of the user to the first user interface may be modified to a second user interface (e.g., comprising a greater font size relative to the first user interface) in response to the distance of the user to the display device 121 being between fifteen feet and twenty feet.

Figure 5:
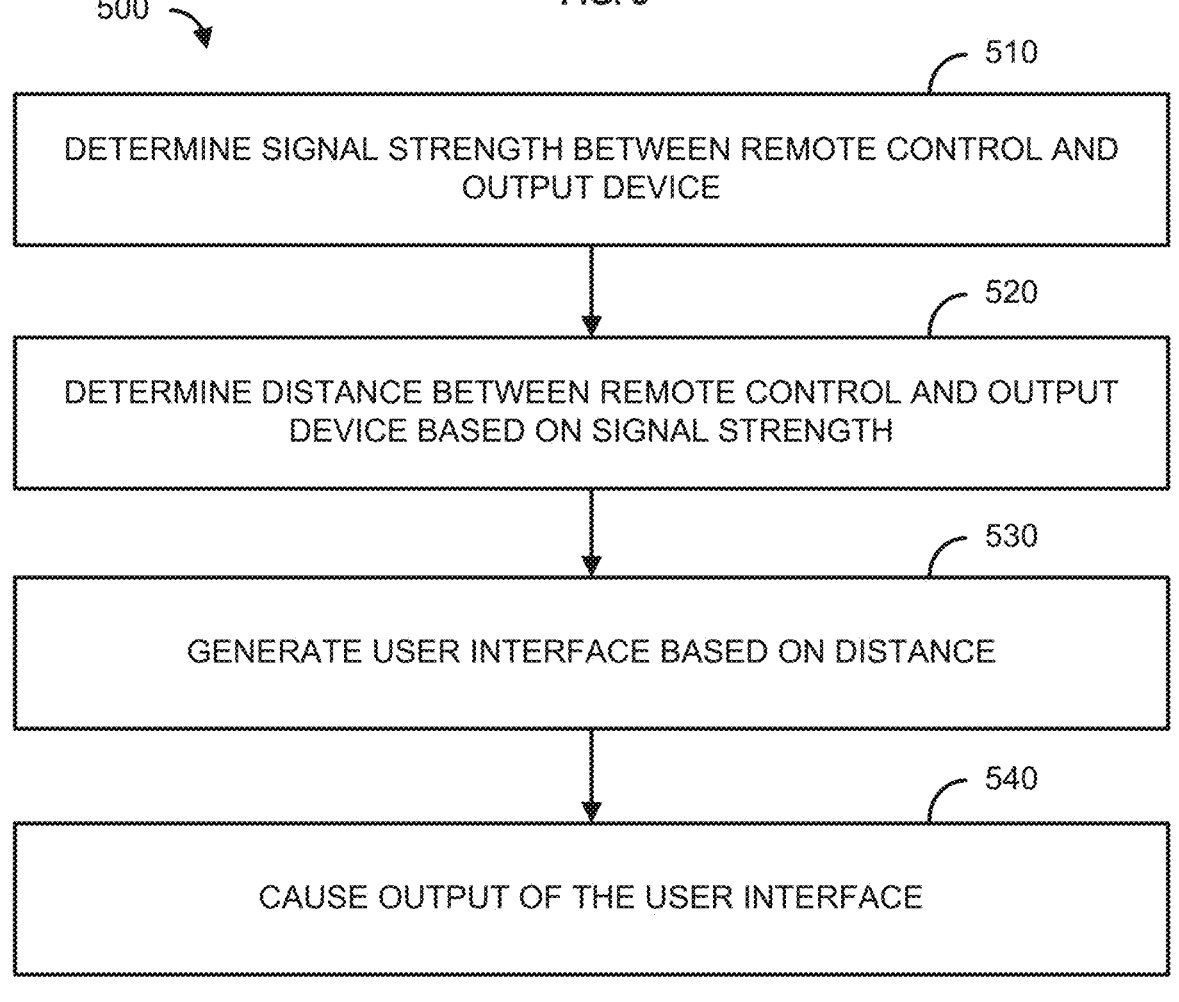
FIG. 5 is a flowchart of a method.

FIG. 5 is a flowchart of a method 500. At step 510, a signal strength of a signal received by output device may be determined (e.g., by the output device 120) from a remote control (e.g., the control device 130). The signal can comprise a radio frequency (RF) signal, infrared signal, microwave signal, or other signal as can be appreciated. The remote control may be configured to transmit the signal at a predefined interval. Thus, the signal may be received according to the predefined interval. The signal can also be received as a command transmitted to the output device 120 by the remote control.

At step 520, the distance of the remote control to the output device may be determined, e.g., by the output device 120, based on a signal strength of the received signal. The signal strength of the received signal may be compared to one or more predefined signal strengths. The remote control can be calibrated relative to the output device by transmitting one or more signals at one or more predefined distances. Thus, the signal strength of the transmitted one or more signals can correspond to the one or more predefined signal strengths. The distance of the remote control to the output device may then be determined based on a nearest one of the one or more predefined signal strengths. The distance of the remote control to the output device may also be determined based on a difference between a transmission power of the signal and a strength of the signal as received by the output device.

At step 530, a user interface may be generated (e.g., by the output device 120), based on the determined distance of the remote control to the output device. Generating the user interface may comprise modifying a user interface. The user interface can be modified after determining the distance satisfies a threshold. Modifying the user interface can include modifying a font of the user interface. The font size may be increased or decreased. The font style may be modified from a first style to a second style. Modifying the user interface can also include resizing one or more images. Modifying the user interface may also include determining one or more images for display. Modifying the user interface can also include determining a template or layout to be used for generating the user interface.

Modifying the user interface may include determining one or more distance ranges into which the determined distance falls. A first user interface can be presented in response to the distance of the remote control to the output device being less than or equal to fifteen feet. Thus, the predefined threshold to be satisfied is fifteen feet. The first user interface may be modified to a second user interface (e.g., comprising a greater font size relative to the first user interface) in response to the distance of the remote control to the output device being between fifteen feet and twenty feet. The first and/or second user interface can be modified to a third user interface (e.g., comprising a greater font size relative to the first/second user interface) in response to the distance of the remote control to the output device being greater than twenty feet. The user interface can also be dynamically modified based on the determined distance of the user to the first user interface can be modified to a second user interface (e.g., comprising a greater font size relative to the first user interface) in response to the distance of the remote control to the output device being between fifteen feet and twenty feet. At step 540 the user interface, as modified, may be caused to be output (e.g., by the output device 120 to the display device 121).

Figure 6:
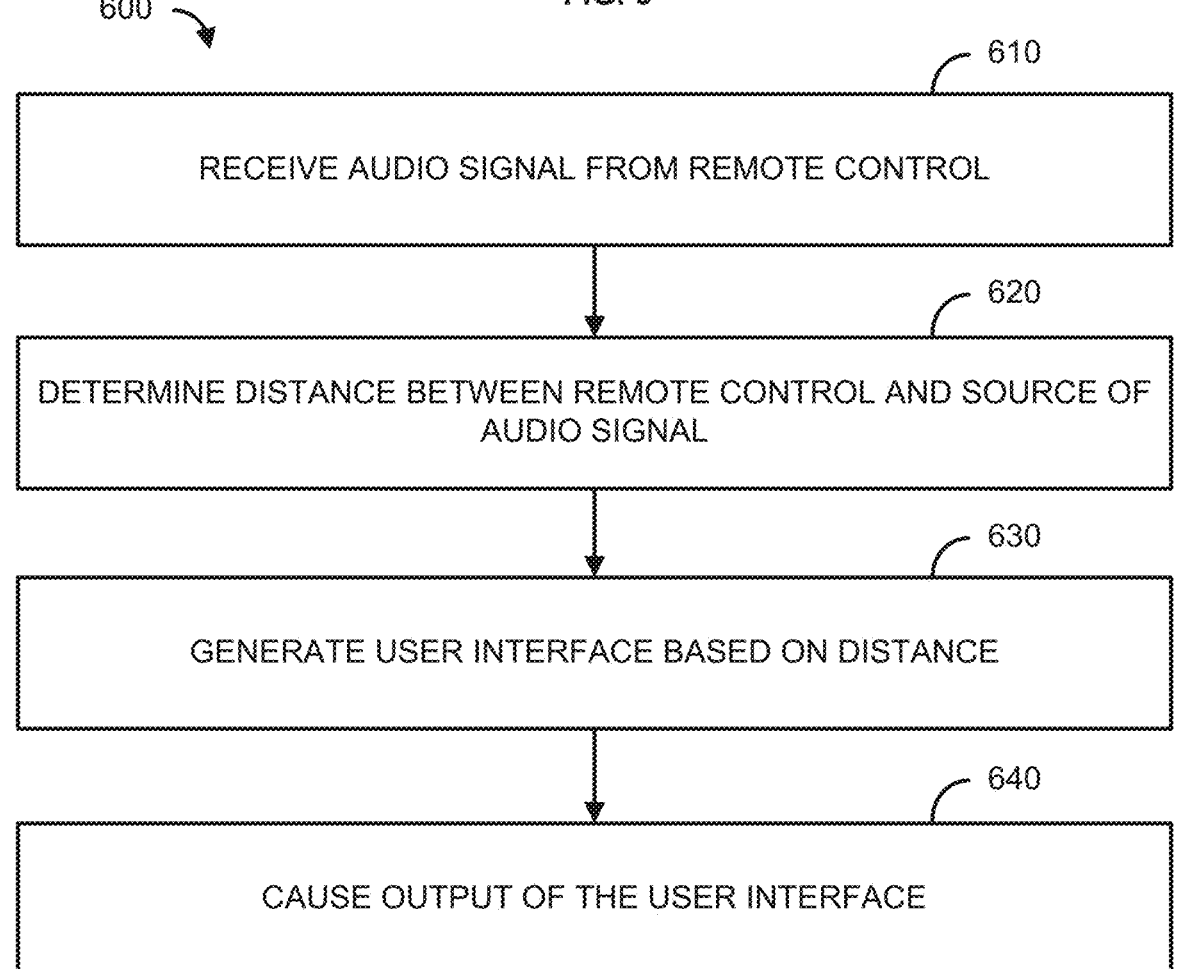
FIG. 6 is a flowchart of a method.

FIG. 6 is a flowchart of a method 600. At step 610, an audio signal may be received, e.g., by output device 120. The audio signal may comprise an audio signal received by a microphone of a remote control (e.g., the control device 130) and transmitted by the remote control to the output device 120. At step 620, the distance of the remote control to a source of the audio signal (e.g., the output device 120, the display device 121, and/or one or more speakers) may be determined, e.g., by the output device 120. The distance of the remote control to the source of the audio signal can be determined based on a signal-to-noise ratio of the audio signal. The distance of the remote control to the source of the audio signal can be determined based on a difference between an output time of the audio signal and a time of receiving the audio signal by the remote control. The distance of the remote control to the source of the audio signal can be determined based on a difference between an output volume of the audio signal and a volume of receiving the audio signal by the remote control.

At step 630, a user interface may be generated (e.g., by the output device 120), based on the determined distance of the remote control to the source of the audio signal. Generating the user interface may comprise modifying a user interface. The user interface may be modified after determining the distance satisfies a threshold. Modifying the user interface may include modifying a font of the user interface. The font size may be increased or decreased. The font style may be modified from a first style to a second style. Modifying the user interface can also include resizing one or more images. Modifying the user interface can also include determining one or more images for display. Modifying the user interface may also include determining a template or layout to be used for generating the user interface.

Modifying the user interface may include determining one or more distance ranges into which the determined distance falls. A first user interface may be presented in response to the distance of the remote control to the source of the audio signal being less than or equal to fifteen feet. Thus, the predefined threshold to be satisfied is fifteen feet. The first user interface can be modified to a second user interface (e.g., comprising a greater font size relative to the first user interface) in response to the distance of the remote control to the source of the audio signal being between fifteen feet and twenty feet. The first and/or second user interface may be modified to a third user interface (e.g., comprising a greater font size relative to the first/second user interface in response to the distance of the remote control to the source of the audio signal being greater than twenty feet. The user interface can also be dynamically modified based on the determined distance of the user to the first user interface can be modified to a second user interface (e.g., comprising a greater font size relative to the first user interface) in response to the distance of the remote control to the source of the audio signal being between fifteen feet and twenty feet. At step 640 output of the user interface as modified can be caused (e.g., by the output device 120 to the display device 121).

Figure 7:
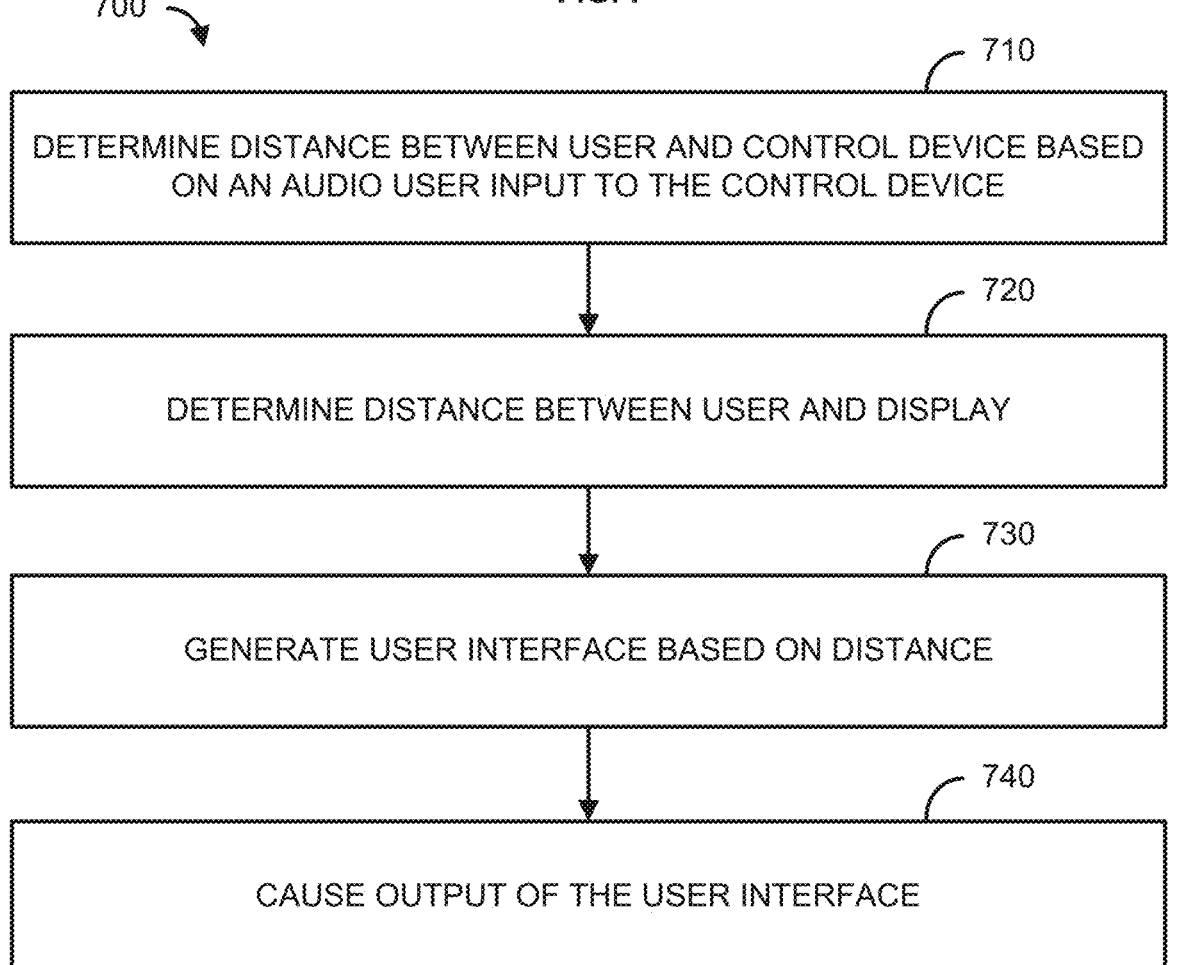
FIG. 7 is a flowchart of a method.

FIG. 7 is a flowchart 700 of a method. At step 710, a distance of a user to a stationary control device (e.g., the control device 130) can may be determined (e.g., by the control device 130 or output device 120). The distance of the user to the stationary control device may be determined based on an audio input (e.g., a voice command) to the stationary control device. A volume of the audio input may be used to determine the distance of the user to the stationary control device.

At step 720, a distance between the user and a display device (e.g., the display device 121) may be determined (e.g., by the control device 130 or the output device 120). Determining the distance between the user and the display device may comprise determining a distance between the stationary control device and the display device. The distance of the stationary control device to the display device can comprise a predefined distance, e.g., a user input or configuration. The distance of the stationary control device to the display device can also be determined (e.g., by the control device 302 or the output device 120) based on one or more audio signals received by the stationary control device. The one or more audio signals may be output by the display device or one or more stationary speakers and received by one or more microphones of the stationary control device. The distance of the user to the display device can be determined as a function of the distance from the user to the stationary control device and the distance of the stationary control device to the display device. The distance of the user to the display device can be based on a sum of the distance of the user to the stationary control device and the distance of the stationary control device to the display device.

The distance of the user to the display device may be determined trigonometrically based on a sum of the distance of the user to the stationary control device and the distance of the stationary control device to the display device. The stationary control device may comprise a plurality of microphones. The stationary control device 130 can then determine the angles of the stationary control device relative to the display device and relative to the user based on audio signals received by the plurality of microphones. The determined angles and distances may then be used to trigonometrically determine the distance of the user to the display device.

At step 730, a user interface may be generated (e.g., by the output device 120) based on the determined distance between the user and the display device. Generating the user interface may comprise modifying a user interface based on the distance. It may be determined to modify the user interface after determining the distance of the user to the display device satisfies a threshold. Modifying the user interface can include modifying a font of the user interface. The font size can be increased or decreased. The font style can be modified from a first style to a second style. Modifying the user interface may also include resisting one or more images. Modifying the user interface may also include determining one or more images for display. Modifying the user interface may also include determining a template or layout to be used for generating the user interface.

Modifying the user interface may include determining one or more distance ranges into which the distance of the user to the display device falls. A first user interface may be presented in response to the distance of the user to the display device being less than or equal to fifteen feet. Thus, the predefined threshold to be satisfied is fifteen feet. The first user interface can be modified to a second user interface (e.g., comprising a greater font size relative to the first user interface) in response to the distance of the user to the display device being between fifteen feet and twenty feet. The first and/or second user interface may be modified to a third user interface (e.g., comprising a greater font size relative to the first/second user interface) in response to the distance of the user to the display device being greater than twenty feet. The user interface can also be dynamically modified based on the determined distance of the user to the first user interface can be modified to a second user interface (e.g., comprising a greater font size relative to the first user interface) in response to the distance of the user to the display device being between fifteen feet and twenty feet. At step 740 output of the user interface as modified may be caused (e.g., by the output device 120 to the display device 121).

Figure 8:
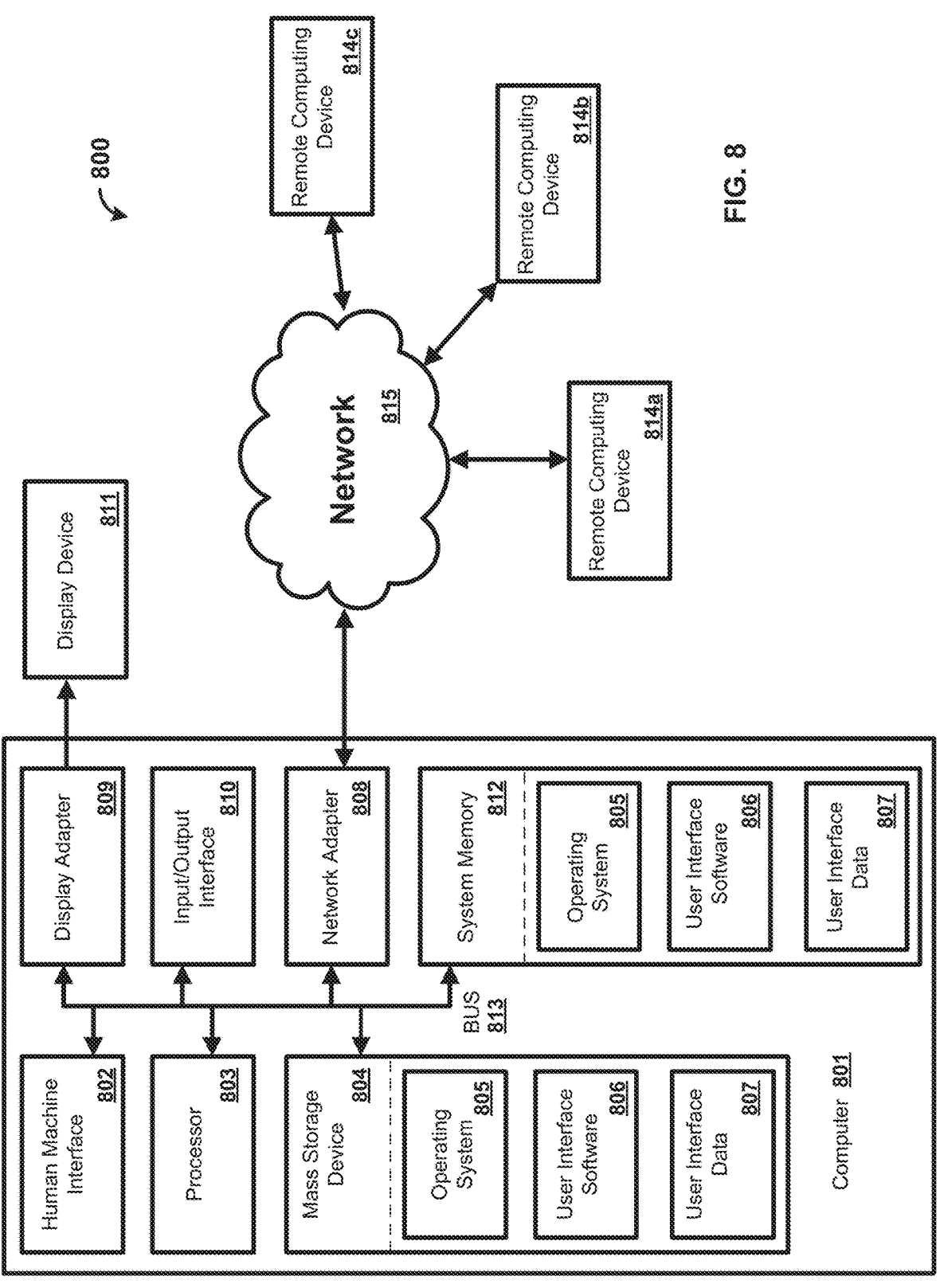
FIG. 8 is a diagram of a computing device.

The methods and systems may be implemented on a computer 801 as shown in FIG. 8 and described below. The output device 120 and/or control device 130 of FIG. 1 can be a computer as shown in FIG. 8. The methods and systems described may utilize one or more computers to perform one or more functions in one or more locations. FIG. 8 is a block diagram showing an operating environment for performing the described methods. The operating environment is only an example of an operating environment and is not intended to suggest any limitation as to the scope of use or functionality of operating environment architecture. Neither should the operating environment be interpreted as having any dependency or requirement relating to any one or combination of components shown in the exemplary operating environment.

The methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the described methods and systems may be performed by software components. The described systems and methods can be described in the general context of computer-executable instructions, such as program modules, being executed by one or more computers or other devices. Program modules comprise computer code, routines, programs, objects, components, data structures, etc. that perform particular tasks or implement particular abstract data types. The described methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods described herein may be implemented via a general-purpose computing device in the form of a computer 801. The components of the computer 801 may comprise, but are not limited to, one or more processors 803, a system memory 812, and a system bus 813 that couples various system components including the one or more processors 803 to the system memory 812. The system may utilize parallel computing.

The system bus 813 represents one or more of several possible types of bus structures, including a memory bus or memory controller, a peripheral bus, an accelerated graphics port, or local bus using any of a variety of bus architectures. Such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AUP) bus, and a Peripheral Component Interconnects (PCI), a PCI-Express bus, a Personal Computer Memory Card Industry Association (PCMCIA), Universal Serial Bus (USB) and the like. The bus 813, and all buses specified in the description may also be implemented over a wired or wireless network connection and each of the subsystems, including the one or more processors 803, a mass storage device 804, an operating system 805, user interface software 806, user interface data 807, a network adapter 808, the system memory 812, an Input/Output Interface 810, a display adapter 809, a display device 811, and a human machine interface 802, may be contained within one or more remote computing devices 814*a,b,c* at physically separate locations, connected through buses of this form, in effect implementing a fully distributed system.

The computer 801 typically comprises a variety of computer readable media. The readable media can be any available media that is accessible by the computer 801 and comprises both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as the user interface data 807 and/or program modules such as the operating system 805 and the user interface software 806 that are immediately accessible to and/or are presently operated on by the one or more processors 803.

The computer 801 may also comprise other removable/non-removable, volatile/non-volatile computer storage media. FIG. 8 shows the mass storage device 804 which may provide non-volatile storage of computer code, computer readable instructions, data structures, program modules, and other data for the computer 801. The mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 804, including the operating system 805 and the user interface software 806. Each of the operating system 805 and the user interface software 806 (or some combination thereof) may comprise elements of the programming and the user interface software 806. The user interface data 807 may also be stored on the mass storage device 804. The user interface data 807 may be stored in any of one or more databases known in the art. Such databases comprise, DB2®, Microsoft® Access, Microsoft® SQL Server, Oracle®, mySQL, PostgreSQL, and the like. The databases can be centralized or distributed across multiple systems.

The user may enter commands and information into the computer 801 via an input device (not shown). Such input devices comprise, but are not limited to, a keyboard, pointing device (e.g., a "mouse"), a microphone, a joystick, a scanner, tactile input devices such as gloves, and other body coverings, and the like. These and other input devices can be connected to the one or more processors 803 via the human machine interface 802 that is coupled to the system bus 813, but can be connected by other interface and bus structures, such as a parallel port, game port, an IEEE 1394 Port (also known as a Firewire port), a serial port, or a universal serial bus (USB).

The display device 811 may also be connected to the system bus 813 via an interface, such as the display adapter 809. It is contemplated that the computer 801 may have more than one display adapter 809 and the computer 801 may have more than one display device 811. The display device 811 can be a monitor, an LCD (Liquid Crystal Display), or a projector. In addition to the display device 811, other output peripheral devices may comprise components such as speakers (not shown) and a printer (not shown) which can be connected to the computer 801 via the Input/Output Interface 810. Any step and/or result of the methods may be output in any form to an output device. Such output can be any form of visual representation, including, but not limited to, textual, graphical, animation, audio, tactile, and the like. The display device 811 and computer 801 may be part of one device, or separate devices.

The computer 801 may operate in a networked environment using logical connections to one or more remote computing devices 814a,b,c. A remote computing device may be a personal computer, portable computer, smartphone, a server, a router, a network computer, a peer device or other common network node, and so on. Logical connections between the computer 801 and a remote computing device 814a,b,c can be made via a network 815, such as a local area network (LAN) and/or a general wide area network (WAN). Such network connections can be through the network adapter 808. The network adapter 808 may be implemented in both wired and wireless environments. Such networking environments are conventional and commonplace in dwellings, offices, enterprise-wide computer networks, intranets, and the Internet.

Application programs and other executable program components such as the operating system 805 are shown herein as discrete blocks, although it is recognized that such programs and components reside at various times in different storage components of the computing device 801, and are executed by the one or more processors 803 of the computer. An implementation of the user interface software 806 may be stored on or transmitted across some form of computer readable media. Any of the described methods can be performed by computer readable instructions embodied on computer readable media. Computer readable media can be any available media that can be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems may employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice described herein. It is intended that the specification and examples be considered as exemplary only, with a true scope and spirit being indicated by the following claims.

What is claimed is:

1. A method, comprising:
receiving, by a device from a remote control, an audio signal received by the remote control, wherein the audio signal is output by a source of the audio signal;
modifying, based on user input, a distance threshold associated with outputting a user interface;
determining, based on a difference between a volume of the audio signal received by the remote control and a volume associated with the audio signal output by the source, a distance between the remote control and the source of the audio signal;
modifying, based on the distance between the remote control and the source satisfying the modified distance threshold, the user interface; and
causing output of the modified user interface.

2. The method of claim 1, wherein determining the distance between the remote control and the source comprises determining a signal-to-noise ratio in the audio signal.

3. The method of claim 1, wherein determining the distance between the remote control and the source of the audio signal comprises comparing an output time of the audio signal and a reception time of the audio signal.

4. The method of claim 1, wherein modifying, based on the distance between the remote control and the source satisfying the modified distance threshold, the user interface comprises modifying one or more attributes of another user interface.

5. The method of claim 4, wherein the one or more attributes comprise a user interface layout or a font size.

6. The method of claim 1, further comprising receiving an indication of the volume associated with the audio signal output by the source.

7. The method of claim 6, wherein the indication is based on an audio input.

8. The method of claim 1, wherein the source of the audio signal comprises one or more of the device, a display device, or one or more speakers.

9. An apparatus comprising:
one or more processors; and
a memory storing processor-executable instructions that, when executed by the one or more processors, cause the apparatus to:
receive, by a device from a remote control, an audio signal received by the remote control, wherein the audio signal is output by a source of the audio signal;
modify, based on user input, a distance threshold associated with outputting a user interface;

determine, based on a difference between a volume associated with the audio signal received by the remote control and a volume associated with the audio signal output by the source, a distance between the remote control and the source of the audio signal;
modify, based on the distance between the remote control and the source satisfying the modified distance threshold, the user interface; and
cause output of the modified user interface.

10. The apparatus of claim 9, wherein the processor-executable instructions, that when executed by the one or more processors, cause the apparatus to determine the distance between the remote control and the source, further cause the apparatus to determine a signal-to-noise ratio in the audio signal.

11. The apparatus of claim 9, wherein the processor-executable instructions, that when executed by the one or more processors, cause the apparatus to determine the distance between the remote control and the source of the audio signal, further cause the apparatus to compare an output time of the audio signal and a reception time of the audio signal.

12. The apparatus of claim 9, wherein the processor-executable instructions, that when executed by the one or more processors, cause the apparatus to modify, based on the distance between the remote control and the source satisfying the modified distance threshold, the user interface, further cause the apparatus to modify one or more attributes of another user interface.

13. The apparatus of claim 12, wherein the one or more attributes comprise a user interface layout or a font size.

14. The apparatus of claim 9, wherein the processor-executable instructions, when executed by the one or more processors, further cause the apparatus to receive an indication of the volume associated with the audio signal output by the source.

15. The apparatus of claim 14, wherein the indication is based on an audio input.

16. The apparatus of claim 9, wherein the source of the audio signal comprises one or more of the device, a display device, or one or more speakers.

17. One or more non-transitory computer-readable media storing processor-executable instructions that, when executed by at least one processor, cause the at least one processor to:
receiving, by a device from a remote control, an audio signal received by the remote control, wherein the audio signal is output by a source of the audio signal;
modifying, based on user input, a distance threshold associated with outputting a user interface;
determining, based on a difference between a volume of the audio signal received by the remote control and a volume associated with the audio signal output by the source, a distance between the remote control and the source of the audio signal;
modifying, based on the distance between the remote control and the source satisfying the modified distance threshold, the user interface; and
causing output of the modified user interface.

18. The non-transitory computer-readable media of claim 17, wherein the processor-executable instructions that, when executed by the at least one processor, cause the at least one processor to determine the distance between the remote control and the source, further cause the at least one processor to determine a signal-to-noise ratio in the audio signal.

19. The non-transitory computer-readable media of claim 17, wherein the processor-executable instructions that, when executed by the at least one processor, cause the at least one processor to determine the distance between the remote control and the source of the audio signal, further cause the at least one processor to compare an output time of the audio signal and a reception time of the audio signal.

20. The non-transitory computer-readable media of claim 17, wherein the processor-executable instructions that, when executed by the at least one processor, cause the at least one processor to modify, based on the distance between the remote control and the source satisfying the modified distance threshold, the user interface, further cause the at least one processor to modify one or more attributes of another user interface.

21. The non-transitory computer-readable media of claim 20, wherein the one or more attributes comprise a user interface layout or a font size.

22. The non-transitory computer-readable media of claim 17, wherein the processor-executable instructions, when executed by the at least one processor, further cause the at least one processor to receive an indication of the volume associated with the audio signal output by the source.

23. The non-transitory computer-readable media of claim 22, wherein the indication is based on an audio input.

24. The non-transitory computer-readable media of claim 17, wherein the source of the audio signal comprises one or more of the device, a display device, or one or more speakers.

* * * * *